UNITED STATES PATENT OFFICE.

CHARLES MARCHAND, OF NEW YORK, N. Y.

PRESERVATION OF MEAT.

SPECIFICATION forming part of Letters Patent No. 349,852, dated September 28, 1886.

Application filed August 19, 1885. Serial No. 174,813. (No specimens.)

*To all whom it may concern:*

Be it known that I, CHARLES MARCHAND, of New York city, in the county and State of New York, have invented a new and useful Improvement in the Preservation of Meat, which improvement is fully set forth in the following specification.

The invention relates to the preservation for use as food of meat of all kinds, including beef, mutton, veal, and other butchers' meat, game, fowls, fish, lobsters, and the like.

The processes heretofore used may be divided into three principal classes: First, those which rely upon the exclusion of air, the meat being inclosed in hermetically-sealed envelopes, as in the canning processes of Appert and others, or in the processes which cover the meat with a coating of paraffine, gelatine, and the like; second, those which dry the meat, or treat it with some antiseptic substance—such as smoking, salting, soaking in vinegar, treatment with sulphurous acid, carbolic acid, salicylic acid, boric acid, borax, and the like; and, third, those which maintain the meat at a low temperature. In the processes of the first-named class the meat has to be cooked preparatory to the canning or sealing operation. By the processes of the second class the nutritive properties of the meat are lessened, its taste and appearance are altered, and in some cases it is rendered dangerous to health, while the processes of the third class, although not open to these objections, are costly and, except under limited conditions, are not available.

The present invention is based on the discovery I have made that meat can be preserved raw for weeks, and even months, and perhaps indefinitely, by proper treatment of the same with a solution of peroxide of hydrogen. By this treatment, which can readily be applied, and is capable of a very extended use, nothing injurious is added to the meat, nor is it rendered unpalatable. Peroxide of hydrogen, as is well known, is readily decomposed into oxygen and water, so that when the preserved meat is cooked all traces of it are removed. Practically, I find that if the meat is to be preserved more than a few days it is necessary, for reliably-uniform results, that the peroxide-of-hydrogen solution in which the meat is immersed should be maintained under pressure, and this treatment under pressure is a special feature of my invention; but as the practical application of peroxide of hydrogen as a preservative of meat is believed to be new it is not designed to restrict the invention to such treatment. Of course it will be understood that the treatment with peroxide of hydrogen is applicable to cooked or partly-cooked meats; but cooking is not necessary, and it is decidedly preferable, as a general thing, to have the meat raw, or practically raw, so that it approximates as near as may be to fresh meat, and can be cooked according to the taste of the consumer.

In order to enable others to use the invention, the three following modes, any one of which may be adopted, are given for applying the same. In all of the modes the flesh of large animals should be cut up into pieces, which may weigh as much as eight or nine pounds; but no particular size is essential. Game, fowls, fish, and the like are to be preserved whole. They may of course be cut up; but this is not ordinarily desired. It is not necessary to clean the fish. They may be treated just as they are taken out of the water. Fowls would ordinarily be dressed. Lobsters and similar shell-fish would be preserved in their shells, and may or may not be boiled preparatory to treatment.

*First mode.* The meat is placed in boxes or cans of tinned iron, strong enough to resist an internal pressure of from one to three atmospheres. The boxes or cans are filled as completely as possible with the meat, and are closed hermetically, except that a small hole is left in the top and an opening (preferably about three-sixteenths to a quarter of an inch bore and adapted to receive a screw-threaded tube and be closed by a screw-plug) in the bottom or in the side as close as possible to the bottom. A solution of peroxide of hydrogen in water containing about one to two per cent., by weight, of $H_2O_2$ is introduced through the opening in the bottom until it fills the box or can and begins to escape by the hole in the top. This hole is then closed hermetically and the solution is forced in under a pressure of about two (or even as much as three) atmospheres, so that it penetrates completely the pores of the meat, as well as covers the surface of the same. In presence of peroxide of hydrogen thus compressed putrefaction does not take place. The nutritive elements are not lost to any practical extent, because there is not water enough to dissolve more than a small quantity of the soluble constituents of the meat. The meat is allowed to remain immersed in solution under pressure for three days, and then the solution is renewed. In order to maintain the pressure, it will simply be necessary to close the opening in the bottom of the can or box. For this purpose the pipe screwed into the bottom for admitting the solution should be provided with a stop-cock. In order to remove the old liquid, suction is employed, so that a vacuum is left in the can or box. The solution removed can be concentrated and sold, or other disposition may be made of the same, such disposition forming no part of the invention. A fresh solution of peroxide of hydrogen (of like strength) is then introduced under a like degree of pressure (ingress of air being prevented.) The solution readily penetrates the pores, as well as fills the surrounding spaces, and renders the meat imputrescible for months without loss of its nutritive qualities. I have preserved beef, fish, and fowl for four months without the least bad taste or odor. When thus prepared, the opening in the bottom of the box or can is closed, and the meat is then ready for shipment. The peroxide-of-hydrogen solution remains under pressure after the box or can is closed, the closure being effected while the pressure is on. The pressure is of course retained until the box or can is opened.

*Second mode.* The meat is placed in a box or can hermetically closed, except for an outlet at the bottom, and the air is exhausted and the vacuum maintained for a half-hour or an hour, when about thirty per cent. of the water in the meat will have been removed. The solution of peroxide of hydrogen, which in this case should contain, say, two to two and one-half per cent. of pure peroxide, ($H_2O_2$,) is then introduced (ingress of air being prevented) under a pressure of two to three atmospheres. The solution of peroxide of hydrogen being more concentrated than in the preceding case, it is not necessary to renew it, and the opening in the bottom of the can or box being closed the meat is ready for shipment. The meat will be preserved for four or five months, and probably a much longer time.

*Third mode.* The meat is deprived of from forty to fifty per cent. of the contained water by placing it in a vacuum, and is then covered with gutta-percha, caoutchouc, or like material, by immersion two or three times in a solution of one or the other of these substances in a suitable solvent—as, for example, sulphide of carbon for gutta-percha or caoutchouc. The meat thus coated is placed in the box or can, which is filled with a two to two and a half per cent. solution of peroxide of hydrogen under a pressure of two atmospheres. In preserving meat by this mode great care is necessary in order to produce as good results as by the two preceding modes. I have preserved beef, mutton, and veal by it for two months. I have also preserved fish for five weeks as fresh as when taken from the water. Should the coating to the meat become pervious, the peroxide of hydrogen effectually prevents the beginning of putrefaction at that point.

By each and all these modes the meat is preserved in a natural condition without alteration of its nutritive and digestible properties, and without addition or production of any deleterious or unpalatable qualities. Moreover, the preserved meats can be preserved and transported at any ordinary temperature. A temperature of about 70° Fahrenheit existed in my experiments.

It will of course be understood that modifications may be made in details without departing from the spirit of the invention.

The boxes or cans may of course be made of any suitable material not liable to be injuriously acted upon by the peroxide of hydrogen.

Having now fully described my said invention and the manner in which the same is or may be carried into effect, what I claim is—

1. The process of preserving meat by immersing the same in a solution of hydrogen peroxide in close vessels and retaining the said solution under pressure, substantially as described.

2. The process of preserving meat by immersing the same in a raw state in a solution of hydrogen peroxide in close vessels and retaining the said solution under pressure, substantially as described.

3. The process of preserving meat by treating the same with peroxide of hydrogen in solution, substantially as described.

4. As a new manufacture, meat immersed in and impregnated with a solution of peroxide of hydrogen, substantially as described.

5. The method of preserving food and other substances, which consists in keeping the same impregnated or charged with an antiseptic or preservative in liquid form by subjecting it to continuous pressure of such preservative itself, substantially as described.

6. The method of preserving food substance or other matter in solid or other form, which method consists in keeping the matter to be preserved charged with a suitable liquid antiseptic or preservative substance by retaining it until used under constant or continuous pressure of such antiseptic or preservative itself, substantially as described.

In testimony whereof I have signed this specification in the presence of two subscribing witnesses.

CHAS. MARCHAND.

Witnesses:
PHILIP MAURO,
C. J. HEDRICK.